US012165087B2

(12) United States Patent
Jin et al.

(10) Patent No.: US 12,165,087 B2
(45) Date of Patent: Dec. 10, 2024

(54) PART SUPPLY SYSTEM AND METHOD FOR OPERATING PART SUPPLY SYSTEM

(71) Applicants: Hyundai Motor Company, Seoul (KR); Kia Corporation, Seoul (KR)

(72) Inventors: Young Seok Jin, Seoul (KR); Yeon Woo Song, Gunpo-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 185 days.

(21) Appl. No.: 17/871,564

(22) Filed: Jul. 22, 2022

(65) Prior Publication Data

US 2023/0088693 A1    Mar. 23, 2023

(30) Foreign Application Priority Data

Sep. 15, 2021  (KR) .......................... 10-2021-0123511

(51) Int. Cl.
*G06Q 10/0631*  (2023.01)
*G06Q 10/0875*  (2023.01)
*G06Q 50/04*    (2012.01)

(52) U.S. Cl.
CPC .  *G06Q 10/06311* (2013.01); *G06Q 10/06316* (2013.01); *G06Q 10/0875* (2013.01); *G06Q 50/04* (2013.01)

(58) Field of Classification Search
CPC ............. G06Q 50/04; G06Q 10/06311; G06Q 10/06316; G06Q 10/08; G06Q 10/087
See application file for complete search history.

(56) References Cited

U.S. PATENT DOCUMENTS

| 4,722,653 A * | 2/1988 | Williams ................ B23P 21/00 198/346.2 |
| 4,958,292 A * | 9/1990 | Kaneko .............. G06Q 10/0875 700/106 |
| 5,528,489 A * | 6/1996 | Asahara ............... G06Q 10/087 705/28 |

(Continued)

FOREIGN PATENT DOCUMENTS

KR    20040092568 A    11/2004

OTHER PUBLICATIONS

Boysen, Nils et al., Parts logistics in the automotive industry: Decision problems, literature review, and research agenda European Journal of Operational Research, vol. 242, 2015 (Year: 2015).*

(Continued)

*Primary Examiner* — Scott L Jarrett
(74) *Attorney, Agent, or Firm* — SLATER MATSIL, LLP (57) ABSTRACT

An embodiment method for using a part supply system to load and supply parts required for processes in producing a mobility includes creating, by a processor, a part supply schedule in which the parts required for the processes in producing the mobility for each of a plurality of time zones are scheduled, creating, by the processor, a part loading schedule in which the parts to be loaded on each work bench to which the pails are supplied according to the part supply schedule for each time zone are scheduled, verifying, by the processor, whether the part loading schedule satisfies the part supply schedule through a digital twin, and confirming or modifying, by the processor, the part loading schedule based on the verification through the digital twin.

20 Claims, 8 Drawing Sheets

(56) References Cited

U.S. PATENT DOCUMENTS

| | | | | |
|---|---|---|---|---|
| 5,793,638 | A * | 8/1998 | Yao | G05B 19/4189 700/226 |
| 6,560,508 | B1 * | 5/2003 | Radican | G06Q 10/087 700/214 |
| 6,705,523 | B1 * | 3/2004 | Stamm | G06Q 10/08 235/383 |
| 6,813,539 | B2 * | 11/2004 | Morimoto | G05B 19/41865 700/95 |
| 7,251,612 | B1 * | 7/2007 | Parker | G06Q 10/06316 705/7.22 |
| 7,346,530 | B2 * | 3/2008 | Jones | G06Q 10/06315 705/7.24 |
| 7,712,654 | B2 * | 5/2010 | Yamaguchi | G06Q 10/06 235/376 |
| 8,010,220 | B1 * | 8/2011 | Ames | G06Q 10/08 414/467 |
| 8,086,337 | B1 * | 12/2011 | Green | G06Q 10/06313 705/28 |
| 8,311,905 | B1 * | 11/2012 | Campbell | G06Q 10/08 235/382 |
| 8,869,370 | B2 * | 10/2014 | Kilibarda | B23P 19/001 29/430 |
| 10,336,384 | B2 * | 7/2019 | Nordbruch | B62D 65/18 |
| 10,831,183 | B2 * | 11/2020 | Katti | G05B 19/4188 |
| 10,852,717 | B2 * | 12/2020 | Finke | G06Q 10/08 |
| 10,990,919 | B2 * | 4/2021 | Gariepy | G06Q 10/06313 |
| 11,188,596 | B2 * | 11/2021 | Xue | G06F 16/906 |
| 11,301,597 | B2 * | 4/2022 | Hsu | G06Q 50/04 |
| 11,403,541 | B2 * | 8/2022 | Thomsen | G05B 13/044 |
| 11,593,739 | B2 * | 2/2023 | Kawakami | G05B 19/418 |
| 11,619,927 | B2 * | 4/2023 | Akella | G06Q 10/06316 703/1 |
| 11,842,315 | B2 * | 12/2023 | Gariepy | G06Q 10/06313 |
| 11,900,277 | B2 * | 2/2024 | Thomsen | G05B 13/041 |
| 2002/0059089 | A1 * | 5/2002 | Suzuki | G06Q 10/06 705/15 |
| 2002/0103726 | A1 * | 8/2002 | Jones | G06Q 10/06315 705/28 |
| 2004/0111339 | A1 * | 6/2004 | Wehrung | G06Q 40/12 705/30 |
| 2007/0228142 | A1 * | 10/2007 | Yamaguchi | G06Q 10/06 235/383 |
| 2007/0271159 | A1 * | 11/2007 | Jones | G06Q 10/087 705/28 |
| 2018/0214998 | A1 * | 8/2018 | Belardinelli | B23P 21/008 |
| 2018/0215541 | A1 * | 8/2018 | Belardinelli | B65G 17/34 |
| 2018/0276595 | A1 * | 9/2018 | Gariepy | G06Q 10/06313 |
| 2019/0095834 | A1 * | 3/2019 | Nakazono | G06Q 10/06312 |
| 2020/0159876 | A1 * | 5/2020 | Hsu | G06Q 50/04 |
| 2020/0265329 | A1 * | 8/2020 | Thomsen | G06N 5/048 |
| 2020/0312036 | A1 * | 10/2020 | Nguyen | G06Q 50/02 |
| 2021/0081870 | A1 * | 3/2021 | Kawakami | G06Q 10/06313 |
| 2021/0124337 | A1 * | 4/2021 | Zehnder | G06Q 10/04 |
| 2021/0141832 | A1 * | 5/2021 | Xue | G06F 16/901 |
| 2022/0083976 | A1 * | 3/2022 | Rakshit | G06Q 10/06315 |
| 2022/0095699 | A1 * | 3/2022 | Bray | B65B 7/28 |
| 2022/0138376 | A1 * | 5/2022 | Li | G06F 30/20 703/7 |
| 2022/0156665 | A1 * | 5/2022 | Beth | G05D 1/0276 |
| 2022/0334561 | A1 * | 10/2022 | Stritzinger | G05B 19/4189 |

OTHER PUBLICATIONS

Wang, Yunrui et al., Model construction of planning and scheduling system based on digital twin The International Journal of Advanced Manufacturing Technology, vol. 109, 2020 (Year: 2020).*
Peng, Yunfang et al., Scheduling Just-in-Time Transport Vehicles to Feed Parts for Mixed Model Assembly Lines Discrete Dynamics in Nature and Society, 2020 (Year: 2020).*
Bill, Michelle, Utilization of a Digital Twin for an Assembly Line KTH Royal Institute of Technology, 2022 (Year: 2022).*
Emde, Simon et al., Scheduling in-house transport vehicles to feed parts to automotive assembly lines European Journal of Operational Research, vol. 260, 2017 (Year: 2017).*
Zhou, Binghai et al., A dynamic scheduling mechanism of part feeding for mixed-model assembly lines based on modified neural network and knowledge base; Software Computer, vol. 25, 2021 (Year: 2021).*
Van den Broeke, Jasper, Scheduling The Provision of Parts to Assembly Lines Universiteit Gent, 2018-2019 (Year: 2021).*
Boysen, Nils et al., Scheduling just-in-time part supply for mixed model assembly lines European Journal of Operational Research, vol. 211, 2011 (Year: 2011).*
Kritzinger, Werner et al., Digital Twin in manufacturing: A categorical literature view and classification IFAC Papers Online, 2018 (Year: 2018).*
Mullerklein, Daniel et al., Integrated consideration of assembly line scheduling and feeding: A new model and case study for automative industry; Computers & Industrial Engineering, vol. 170, 2022 (Year: 2022).*
Battini, Daria et al., Design of the optimal feeding policy in an assembly system International Journal Production Economics, vol. 121, 2009 (Year: 2009).*
Battini, Daria et al., Just-in-Time Supermarkets for part supply in the automotive industry Journal of Management Control, vol. 24, 2013 (Year: 2013).*
Digital Twin Wikipedia.org, Retrieved Jul. 1, 2024 (Year: 2024).*

* cited by examiner

PART SUPPLY SYSTEM AND METHOD FOR OPERATING PART SUPPLY SYSTEM

CROSS-REFERENCE TO RELATED APPLICATIONS

This application claims the benefit of Korean Patent Application No. 10-2021-0123511, filed on Sep. 15, 2021, which application is hereby incorporated herein by reference.

TECHNICAL FIELD

The present disclosure relates to a part supply system and a method for operating the part supply system.

BACKGROUND

An automated storage and retrieval system (ASRS) is a system used to store (load) goods from one storage location to another storage location, and to retrieve and pick the stored goods, and is characterized by accurately storing and removing goods in and from a predefined location, and preventing people from intervening in conveying the goods to a specific processing or interface point.

As a logistics operation method for containing the goods picked from the automatic storage and putting the contained goods into the process necessary for producing a finished product, the conventional logistics operation method has been operated by a rule-based algorithm that is a method for distributing the works required for the goods (parts) in order.

This does not allocate works such as simultaneously considering a number of setboxes necessary for one rack work for each universal parallel workplace in consideration of a box picking work processing time that is a different minimum packaging unit, does not prevent the waiting blocking between pre- and post-processes in a section where a buffer is not installed due to the complexity of a logistics automation facility, does not efficiently allocate a part storage location of the automated storage, and does not secure the robustness if the operation plan is disrupted.

The matters explained as the background art are for the purpose of enhancing the understanding of the background of the present disclosure and are merely technical information that the inventor retained for deriving the embodiments of the present disclosure or acquired in the derivation process, and should not be recognized as corresponding to a known technology that has already been disclosed to those skilled in the art or to the general public before filing.

SUMMARY

The present disclosure relates to a part supply system and a method for operating the part supply system. Particular embodiments relate to a part supply system and a method for operating the part supply system, which optimize a work allocation related to a part supply according to a production plan of a finished product to remove a work delay caused by establishing a work plan related to the part supply using a rule-based algorithm, and which verify the optimized work allocation to remove a deviation between the optimized work allocation and an operation thereof, such as not supplying parts from an automated storage, thereby securing the robustness of the work allocation.

An embodiment of the present disclosure provides a part supply system and a method for operating the part supply system, which optimize a work allocation related to a part supply according to a production plan of a finished product to remove a work delay caused by establishing a work plan related to the part supply using a rule-based algorithm, and verifies the optimized work allocation to remove a deviation between the optimized work allocation and an operation thereof, such as not supplying parts from an automated storage, thereby securing the robustness of the work allocation.

The embodiments of the present disclosure are not limited to the aforementioned embodiments, and other embodiments can also be derived from the following description.

A method for operating, by a processor, a part supply system configured to load and supply a part required for each process to each process in a process of producing a mobility according to embodiments of the present disclosure includes creating, by the processor, a part supply schedule in which a part required in each process of producing the mobility for each time zone is scheduled, creating, by the processor, a part loading schedule in which a part to be loaded on each work bench to which the part is supplied according to the part supply schedule for each time zone is scheduled, verifying, by the processor, whether the part loading schedule satisfies the part supply schedule through a digital twin, and modifying, by the processor, the part loading schedule depending upon a verified result of the digital twin.

The verifying can verify whether the part supply schedule satisfies a quantity of parts transported being equal to or larger than a target quantity of parts transported in the part supply schedule including the quantity of parts transported, and after the verifying, the method can modify a part storing schedule that determines a location of each part and the number of parts to be stored in an automated storage configured to store the part if the quantity of parts transported is smaller than the target quantity of parts transported, and then return to the verifying.

The verifying can verify whether the part supply schedule satisfies a quantity of parts transported being equal to or larger than a target quantity of parts transported in the part supply schedule including the quantity of parts transported, and wherein after the verifying, the method can modify a part loading schedule comprising a transport path through which the part whose work is completed on each work bench to which the part is supplied for each time zone is transported if the quantity of parts transported is smaller than the target quantity of parts transported, and then return to the verifying.

The creating of the part supply schedule can create the part supply schedule in which a part setbox on which a plurality of parts required in each process for each time zone are loaded, a part setbox rack on which the part setbox is loaded, and a rank pallet in which a part not loaded on the part setbox is contained.

The creating of the part loading schedule can create the part loading schedule in which the part to be loaded on each work bench for each time zone is scheduled so that total working times required to load the part setbox on the part setbox rack satisfy a minimum working time.

The creating of the part loading schedule can create the part loading schedule in which the part to be loaded on each work bench for each time zone is scheduled to minimize an operation rate deviation between the respective work benches.

The creating of the part loading schedule can create the part loading schedule in which the work allocation of the part to be loaded on each work bench to which the part is supplied according to the part supply schedule for each time zone and the sequencing between works are scheduled in consideration of an idle time and a blocked time of each work bench.

The creating of the part loading schedule can further include creating a part storing schedule that determines a location of each part and the number of parts to be stored in an automated storage configured to store the part to be loaded on each work bench to which the part is supplied according to the part supply schedule for each time zone, in which the creating of the part storing schedule can create the part storing schedule in consideration of the release frequency of each part every certain period and the part loading schedule of each part.

In the creating of the part storing schedule, a plurality of automated storages can be provided, and the volume of the part stored in each automated storage can be set differently, and the creating of the part storing schedule can create the part storing schedule in consideration of the release frequency of the part stored in each automated storage every certain period and the part loading schedule of the part stored in each automated storage.

In the creating of the part loading schedule, each work bench can include a part setbox work bench configured to load the part corresponding to each automated storage on the part setbox, and the creating of the part loading schedule can create the part loading schedule in which the part to be loaded on each work bench for each time zone is scheduled so that total working times required to load the part setbox on which the part corresponding to each automated storage is loaded on the part setbox rack satisfy a minimum working time.

The automated storage can further include a buffer storage configured to store a part within a preset volume range among parts whose works are completed on the respective work benches, and the creating of the part loading schedule can create the part loading schedule in which the work allocation of the part and the sequencing between works are scheduled in consideration of an idle time and a blocked time of each work bench to which the part outside the volume range is supplied.

Another part supply system according to embodiments of the present disclosure includes a server for operating a part supply system for loading and supplying a part required for each process in a process of producing a mobility to each process and includes a processor configured to control a function of the server, in which the processor can create a part supply schedule in which the part required in each process of producing the mobility for each time zone is scheduled, create a part loading schedule in which a part to be loaded on each work bench to which the part is supplied according to the part supply schedule for each time zone is scheduled, verify whether the part loading schedule satisfies the part supply schedule through a digital twin, and modify the part loading schedule depending upon a verified result of the digital twin.

The processor can verify whether the part supply schedule satisfies a quantity of parts transported being equal to or larger than a target quantity of parts transported in the part supply schedule including the quantity of parts transported, and modify a part storing schedule that determines a location of each part and the number of parts to be stored in an automated storage configured to store the part if the quantity of parts transported is smaller than the target quantity of parts transported and then verify the modified part storing schedule again.

The processor can verify whether the part supply schedule satisfies a quantity of parts transported being equal to or larger than a target quantity of parts transported in the part supply schedule including the quantity of parts transported, and modify a part loading schedule including a transport path through which a part whose work is completed on each work bench to which the part is supplied for each time zone is transported if the quantity of parts transported is smaller than the target quantity of parts transported and then verify the modified part loading schedule again.

Some exemplary embodiments of the present disclosure can provide a recording medium readable by one or more computers having a program that allows the method to be performed recorded therein.

According to the part supply system and the method for operating the part supply system, it is possible to optimize a work allocation related to a part supply according to a production plan of a finished product to remove a work delay caused by establishing a work plan related to the part supply using a rule-based algorithm, and to verify the optimized work allocation to remove a deviation between the optimized work allocation and an operation thereof, such as not supplying parts from an automated storage, thereby securing the robustness of the work allocation.

The effects of embodiments of the present disclosure are not limited to the aforementioned technical effects, and other technical effects can also be derived from the following description.

BRIEF DESCRIPTION OF THE DRAWINGS

The above and other objects, features and other advantages of embodiments of the present disclosure will be more clearly understood from the following detailed description when taken in conjunction with the accompanying drawings, in which.

DETAILED DESCRIPTION OF ILLUSTRATIVE EMBODIMENTS

Specific structural and functional descriptions of the exemplary embodiments of the present disclosure disclosed in the present specification or application are only illustrated for the purpose of describing the exemplary embodiments of the present disclosure, and the exemplary embodiments of the present disclosure can be embodied in various forms and it should not be construed that the present disclosure is limited to the exemplary embodiments described in the present specification or application.

In addition, to clearly describe the present disclosure, portions irrelevant to the description have been omitted, and the same or similar components are denoted by the same reference numerals throughout the specification. In addition, the singular expression includes the plural expression unless the context clearly dictates otherwise.

In addition, in the following detailed description, the classification of the names of the components into first, second, etc. is to distinguish one component from another because the configurations thereof are the same, and they are not necessarily limited to the order thereof in the following description. For example, the first component can be named as the second component, and similarly, the second component can also be referred to as the first component without departing from the scope according to the concept of the present disclosure.

In addition, throughout the specification, when a certain portion "includes" or "has" a certain component, it means that other components can be further included rather than excluding other components, unless otherwise stated. In other words, it should be understood that the term "comprising", "having", etc. specifies the presence of the described characteristic, region, integer, step, operation, constituent element, component, part, or a combination thereof, and does not exclude the presence or addition of one or more other characteristics, regions, integers, steps, operations, constituent elements, components, parts, or combinations thereof in advance.

In addition, in describing the exemplary embodiments disclosed in the present specification, a specific description of detailed descriptions of the related known technology will be omitted when it is determined that it can obscure the gist of the exemplary embodiments disclosed in the present specification.

Lastly, unless defined otherwise, all terms including technical terms or scientific terms used herein have the same meaning as commonly understood by those skilled in the art to which the present disclosure pertains. The terms defined in the dictionary commonly used should be interpreted as having a meaning consistent with the meaning in the context of the related technology, and cannot be interpreted as an ideal or excessively formal meaning, unless clearly defined in the present specification.

Hereinafter, exemplary embodiments of the present disclosure will be described in detail with reference to the accompanying drawings.

Figure 1:
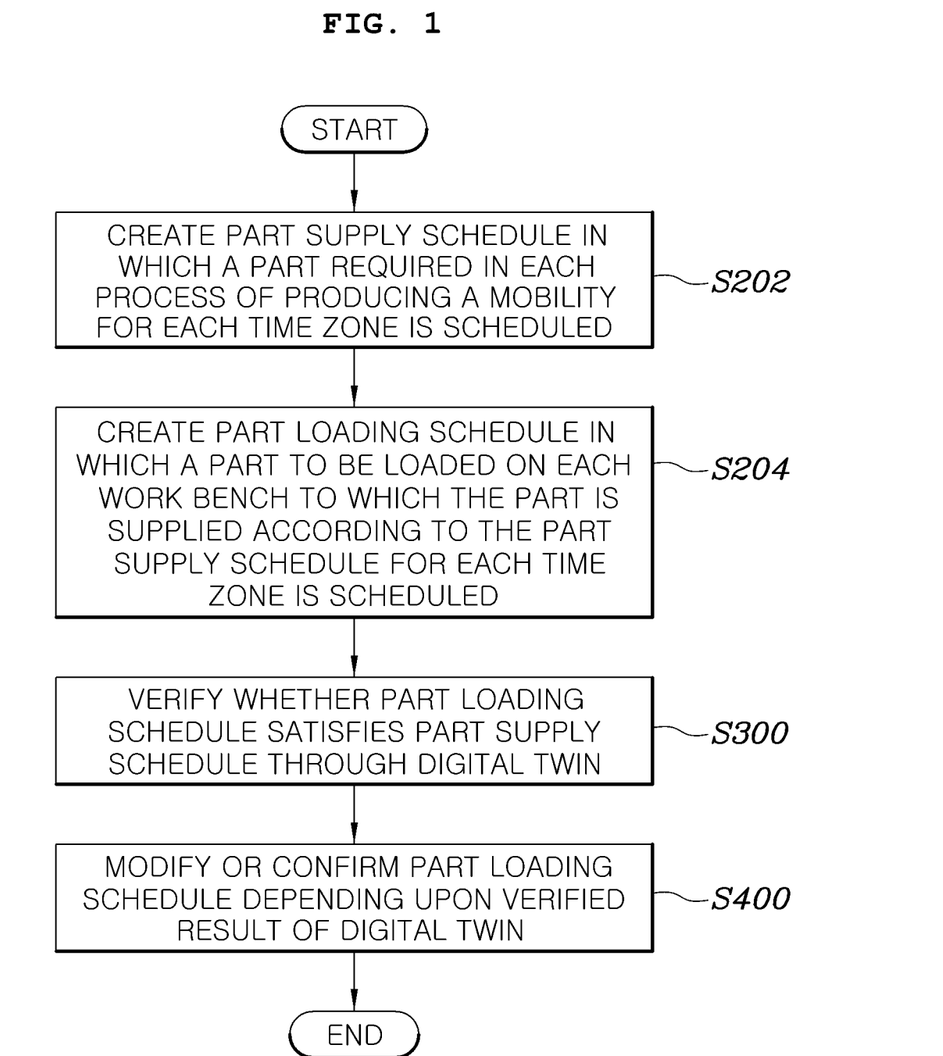
FIG. 1 is a flowchart showing a method for operating a part supply system according to an exemplary embodiment of the present disclosure.
Figure 2:
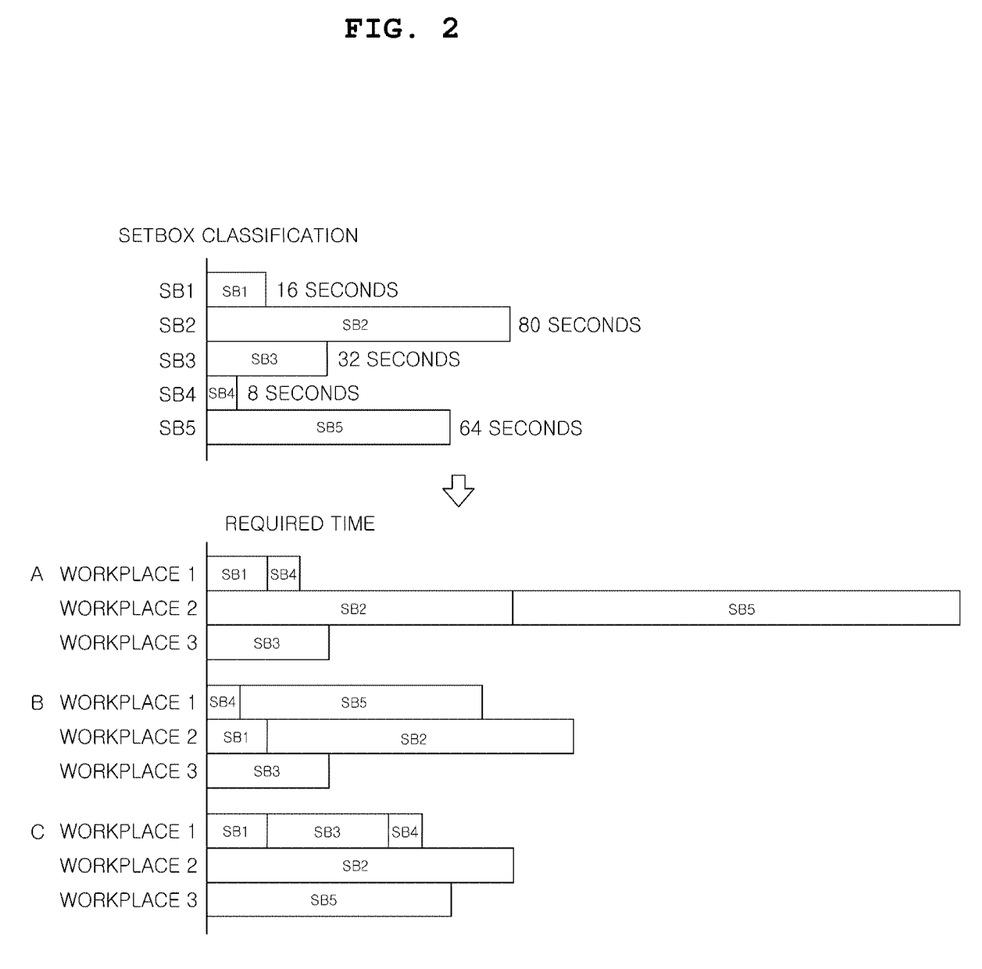
FIG. 2 is a diagram showing some steps of the method for operating the part supply system according to an exemplary embodiment of the present disclosure.
Figure 3:
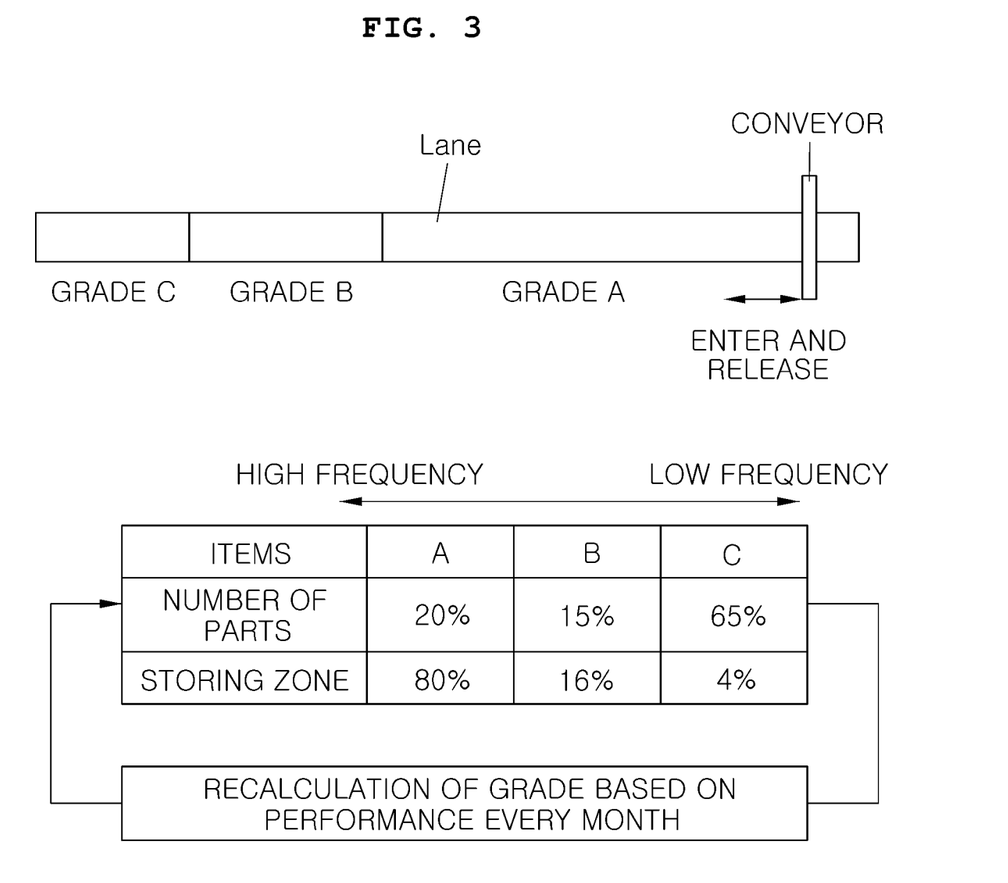
FIG. 3 is a diagram showing some steps of a method for operating a part supply system according to the related art.
Figure 4:
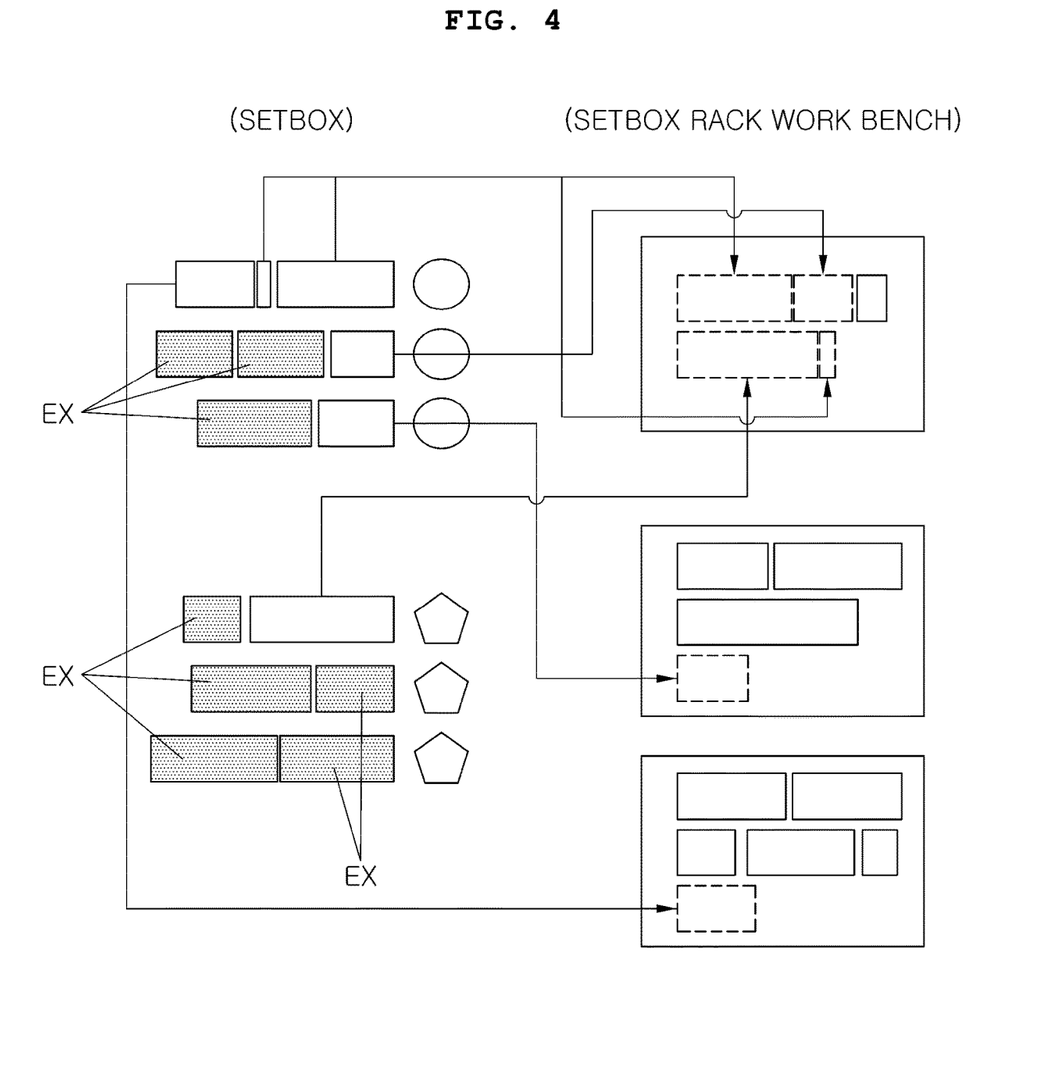
FIG. 4 is a diagram showing some steps of a method for operating the part supply system according to an exemplary embodiment of the present disclosure.
Figure 5:
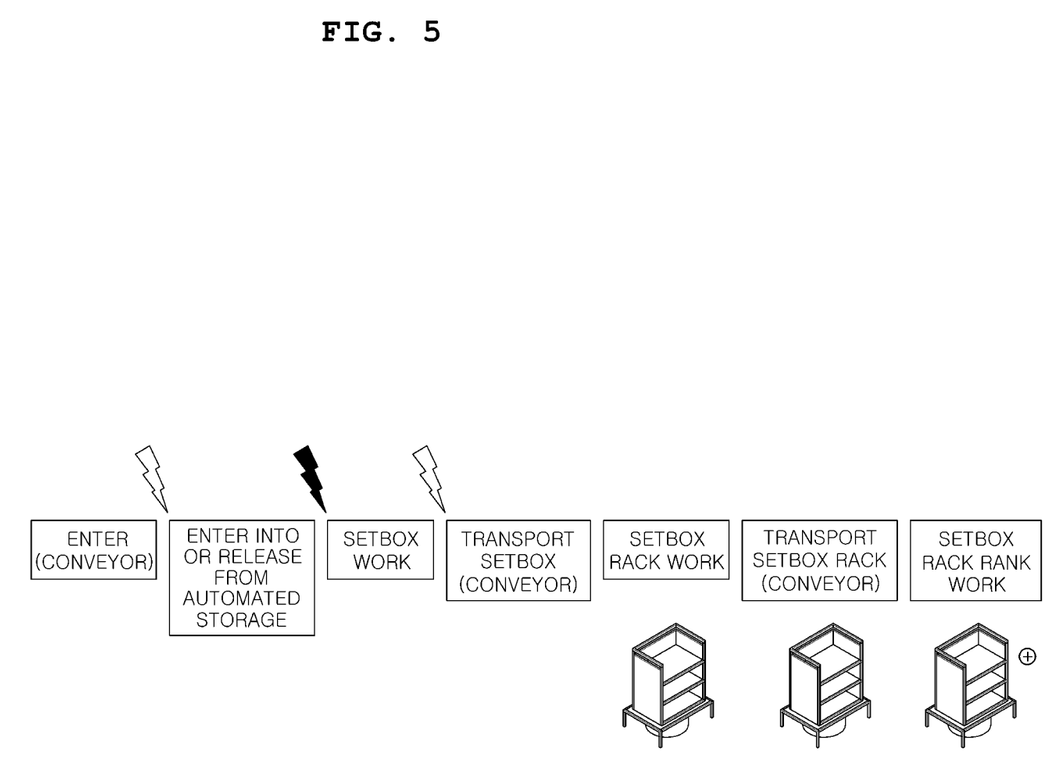
FIG. 5 is a diagram showing the part supply system according to an exemplary embodiment of the present disclosure.
Figure 6:
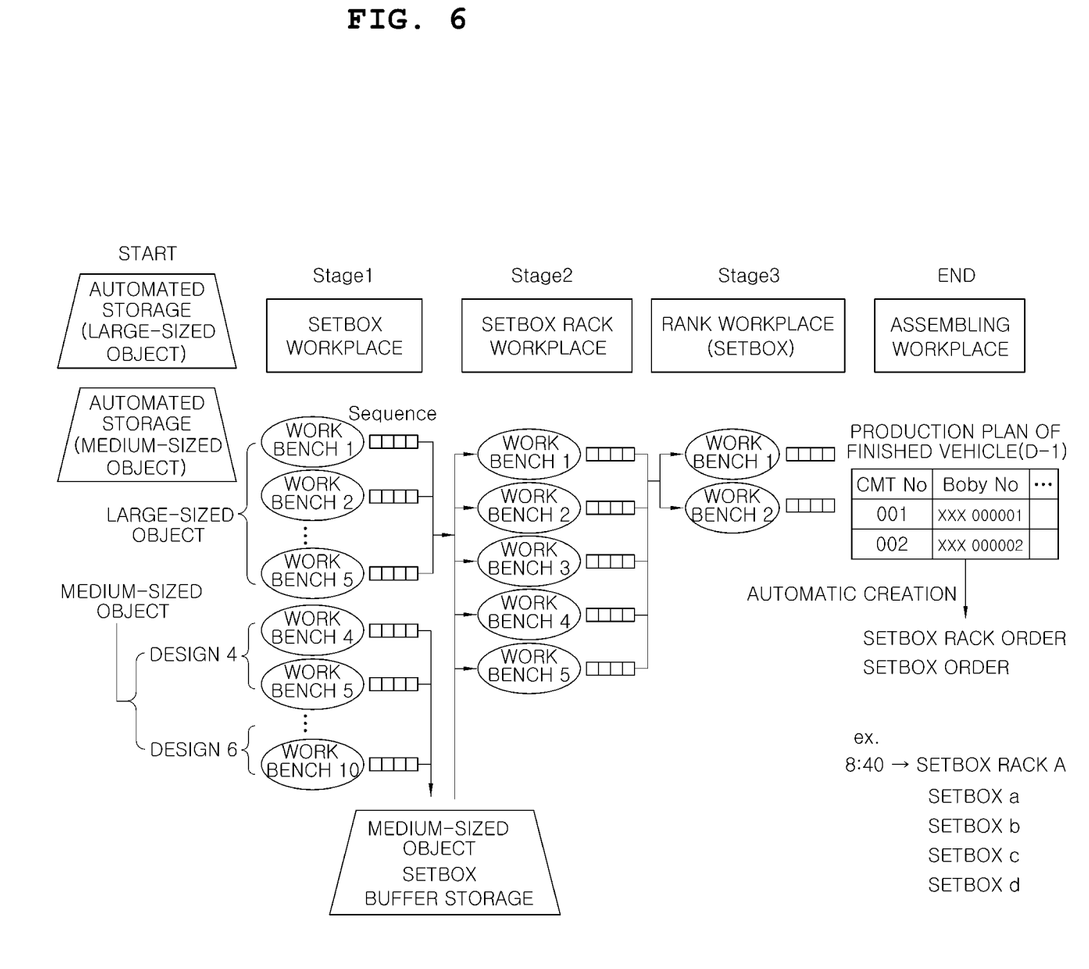
FIG. 6 is a diagram showing a facility configuration according to a method for operating the part supply system according to an exemplary embodiment of the present disclosure.
Figure 7:
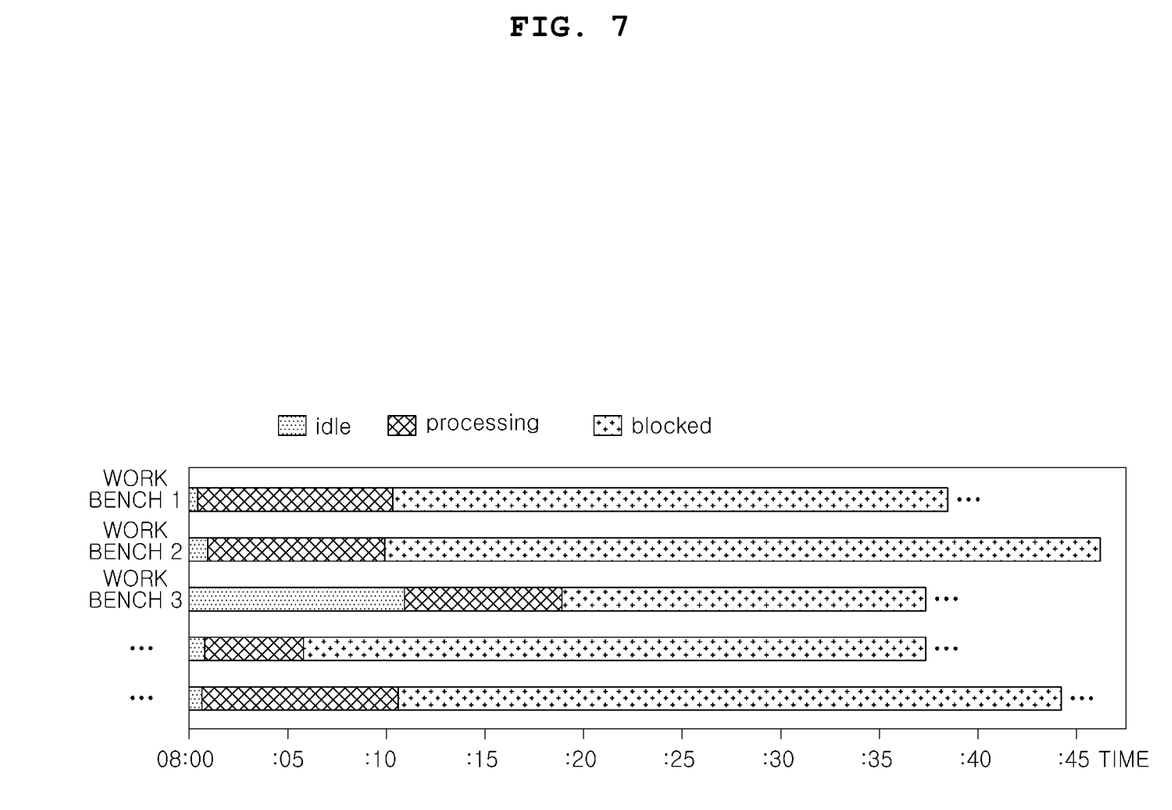
FIG. 7 is a diagram showing a work processing state for each workplace and each work bench according to a method for operating the part supply system according to an exemplary embodiment of the present disclosure.
Figure 8:
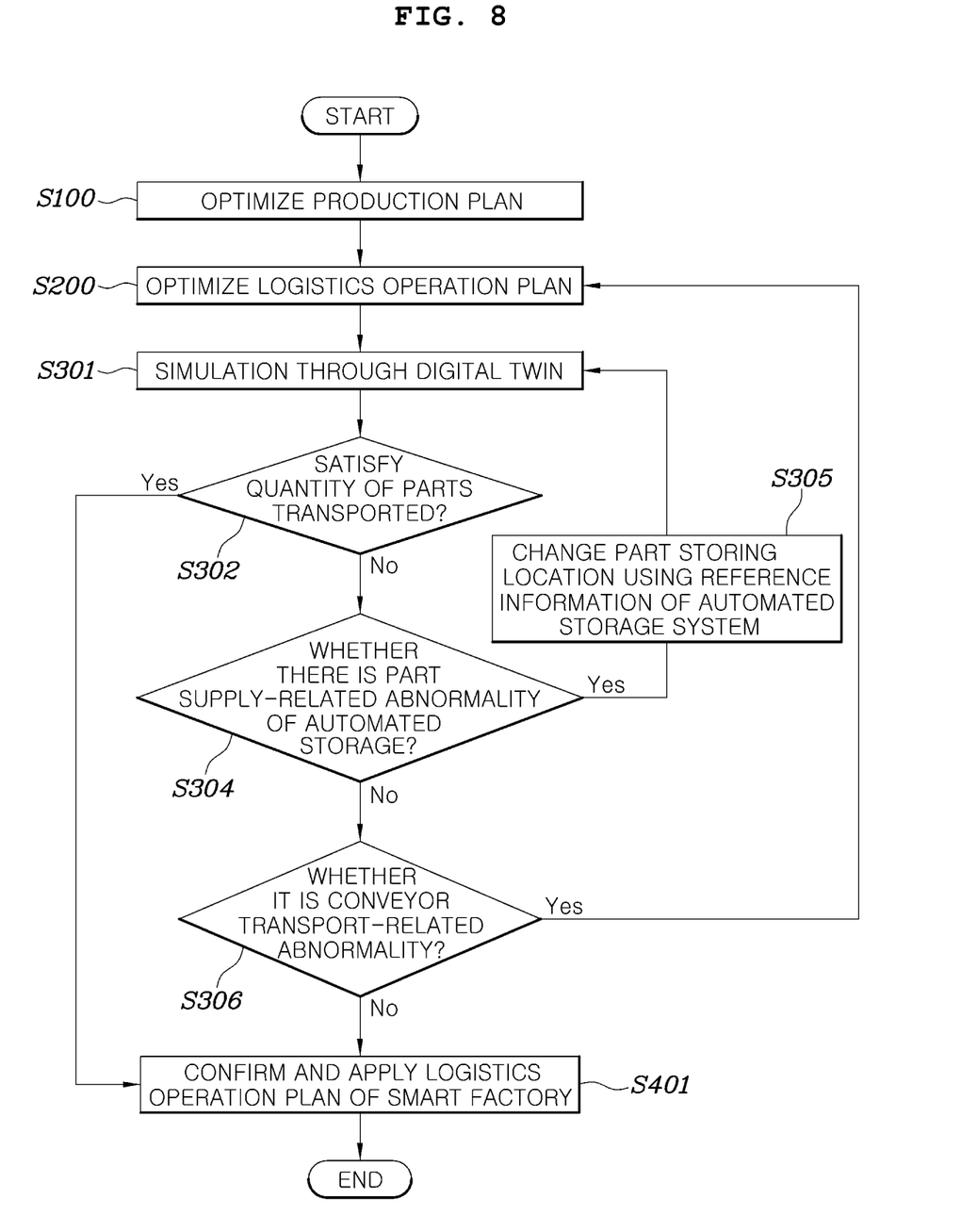
FIG. 8 is a flowchart showing a method for operating the part supply system according to an exemplary embodiment of the present disclosure.

FIG. 1 is a flowchart showing a method for operating a part supply system according to an exemplary embodiment of the present disclosure, FIG. 2 is a diagram showing some steps of a method for operating the part supply system according to an exemplary embodiment of the present disclosure, FIG. 3 is a diagram showing some steps of a method for operating a part supply system according to the related art, FIG. 4 is a diagram showing some steps of a method for operating the part supply system according to an exemplary embodiment of the present disclosure, FIG. 5 is a diagram showing the part supply system according to an exemplary embodiment of the present disclosure, FIG. 6 is a diagram showing a facility configuration according to a method for operating the part supply system according to an exemplary embodiment of the present disclosure, FIG. 7 is a diagram showing a work processing state for each workplace and each work bench according to a method for operating the part supply system according to an exemplary embodiment of the present disclosure, and FIG. 8 is a flowchart showing a method for operating the part supply system according to an exemplary embodiment of the present disclosure.

FIG. 1 is a flowchart showing a method for operating a part supply system according to an exemplary embodiment of the present disclosure, and a method for operating a part supply system according to an exemplary embodiment of the present disclosure is a method for operating a part supply system for loading and supplying a part required for each process to each process by a processor in a process of producing a mobility, and includes creating, by a processor, a part supply schedule in which a part required for each time zone in each process of producing a mobility is scheduled (S202), creating, by the processor, a part loading schedule in which a part to be loaded on each work bench to which the part is supplied according to the part supply schedule for each time zone is scheduled (S204), verifying, by the processor, whether the part loading schedule satisfies the part supply schedule through a digital twin (S300), and modifying or confirming, by the processor, the part loading schedule depending upon a verified result of the digital twin (S400).

As shown in FIG. 1, the part supply system according to an exemplary embodiment of the present disclosure is a system configured to supply the part required for each process in the process of producing the mobility. An example of the process performed by the mobility is shown in Table 1 below.

TABLE 1

| Items | TE1 | TE2 | TE3 | TE4 | TE5 | PM | CM | AM |
|---|---|---|---|---|---|---|---|---|
| Representative work | Door detachment Wiring Plug/pad | Sunroof RR Glass Roof rack Underpad | IEB Bracket (Brake)/ GATE CAB | Headlining C/PAD Blower Rear bumper | Carpet/ Fixed glass/ battery | Brake Tube Engine room Work underbody | Chassis Decking/ Fastening | WCCU Wiring Cable Wheel guard |

| T/F Convertible Cell | | | | | | | | |
|---|---|---|---|---|---|---|---|---|
| 1/4 | 2/5 | 3/6 | FE1 | FE2 | FE3 | FE4 | FE5 | FE6 |
| FRT SIDE Engine room Interior trim | CTR SIDE Wiring W/STRIP Striker | RR SIDE T/GATE Luggage Sill side | FEM RR seat Console Auxiliary battery | FRT seat FRT bumper Back panel molding Luggage Tray | Door mounted Steering wheel | WS glass Tire mounted | Liquid injection Key coding | FRUNK electric parts Coding/ inspection |

As in Table 1, each process of producing the mobility can be performed in the order of the trim equipment (TE1 to TE5) that is a line assembling a vehicle body trim of a vehicle, the PM, the CM, and the AM that are lines constituting a chassis of the vehicle, a T/F convertible that is a line performing all of the trim processes and final processes of the vehicle, and the FE1 to FE6 that are final lines performing a final installation work of the vehicle. The part supply system according to the exemplary embodiment of the present disclosure is a part supply system configured to load and supply the part required for each process to each work bench in the process of producing the mobility.

A first step in the method for operating the part supply system according to the exemplary embodiment of the present disclosure creates the part supply schedule in which the part required for each time zone in each process of producing the mobility is scheduled (S202). Here, the part can be any one of a part setbox on which some or all of a plurality of parts required for each process, or some or all parts, are loaded, a part setbox rack on which a single part setbox or a plurality of part setboxes are loaded, and a rank pallet in which a part not loaded on the part setbox is contained. The above process is a process scheduled for each time zone according to daily/weekly/monthly production plans of the mobility, and the respective processes can be connected in series or in parallel, and therefore, there can be the sequencing therebetween. Therefore, the method for operating the part supply system according to the exemplary embodiment of the present disclosure creates a part supply schedule in which the part required for each process is also scheduled according to an estimated start time/an estimated end time of each process.

A next step creates, by a processor, a part loading schedule in which a part to be loaded on each work bench to which the part is supplied according to the part supply schedule for each time zone is scheduled (S204). Here, as an example of a component on which the part is loaded, there can be a part setbox, a part setbox rack, and/or a rank pallet. The above parts can be transported by a conveyor belt. The parts transported by the conveyor belt can be stored in and picked from an automated storage of an automated storage and retrieval system (ASRS).

A next step verifies, by the processor, whether the part loading schedule satisfies the part supply schedule through a digital twin (S300), and modifies or confirms the part loading schedule depending upon the verified result of the digital twin, by a processor (S400). Here, the digital twin is a technology of creating a twin of real-world objects in a computer, and simulating situations that can occur in reality using the computer to predict the results. In other words, this is a technology of reflecting data received from a sensor, etc. to a digital environment in real time, and predicting problems caused by virtually operating a system on a processor based on the above in advance to solve them. Therefore, this step verifies whether the part loading schedule satisfies the part supply schedule, modifies the part loading schedule when a problem of not reaching a target value occurs, and therefore, confirms the part loading schedule again when the problem does not occur based on the simulated results.

FIG. 2 is a diagram showing some steps of a method for operating the part supply system according to an exemplary embodiment of the present disclosure, and in the method for operating the part supply system according to the exemplary embodiment of the present disclosure, the creating of the part loading schedule (S204) can create the part loading schedule in which the part to be loaded on each work bench for each time zone is scheduled so that total working times required for loading the part setbox on the part setbox rack satisfy a minimum working time. In addition, the creating of the part loading schedule (S204) can create the part loading schedule in which the part to be loaded on each work bench for each time zone is scheduled to minimize an operation rate deviation between the respective work benches. In other words, it is possible to optimize the part loading schedule according to a purpose other than loading the part required for each process in order based on the order of the process.

As shown in the top section of FIG. 2, the following five part setboxes are shown as an example of the part setbox on which one or a plurality of parts are loaded. Assuming that it takes 8 seconds to load each part, an estimated time required for loading each of 2, 10, 4, 1, and 8 parts on each part setbox (SB1 to SB5 in order) is shown in the top section of FIG. 2. A difference in the number of parts can be caused by a difference between the volumes of the respective parts loaded on the part setbox with a constant volume.

The bottom section of FIG. 2 shows a plurality of workplaces in which the work of loading the part on each part setbox is performed. Here, the workplace into which each part setbox is input and the order input into each workplace can be shown in the bottom section of FIG. 2. At this time, A indicates the input result by a rule-based algorithm of a part supply system according to the related art. In other words, A indicates that an SB1 is input into a workplace 1, an SB2 is input into a workplace 2, an SB3 is input into a workplace 3, and again, an SB4 is input into the workplace 1 and an SB5 is input into the workplace 2. Therefore, according to the related art, a blocked time is generated when the work (e.g., part setbox rack work) requiring the plurality of part setboxes is performed.

On the contrary, B and C indicate the input results by a mathematical optimization algorithm of the part supply system according to an exemplary embodiment of the present disclosure. In other words, the part supply system according to an exemplary embodiment of the present disclosure lists the workplaces into which each part setbox is input and the input order thereof like B and C, and among them, selects an optimal input result of satisfying the purpose in which total working times required to load the part setbox on the part setbox rack satisfy the minimum working time, the operation rate deviation between the respective work benches is minimized, and an idle time and a blocked time of each work bench are minimized. Therefore, it is possible to efficiently supply the parts by optimizing the part loading schedule according to the purpose.

Here, the mathematical optimization algorithm can be used. In addition, as the mathematical optimization algorithm, a mixed integer programming (MIP) requiring that only some variables, such as the part setbox input into each work bench, the number of part setboxes, and the input order of the part setboxes, are integers can be used as an integer plan model. Here, an objection function can be total working times required to load the part. In addition, here, decision variables can be the part setbox, the work bench input into the part setbox rack, and the input time input into the work bench. In addition, here, constraint conditions include the number of work benches selected in the workplace, the sequencing between works within the work bench, the blocked time due to the loading congestion of the part by which a buffer storage configured to store intermediate parts whose volume is within a certain range or a certain level or smaller cannot be installed, and the transport time and transport path schedule between the work benches performing the work different from the work bench.

FIG. 3 is a diagram showing some steps of a method for operating a part supply system according to the related art. An automated storage and retrieval system (ASRS) used in the conventional part supply system is a storage configured to store and pick the part, and a location of each part, the number of parts located at the corresponding location, and the property of the part are databased therein. As a part storing system configured to store the part in the automated storage before loading the part as a part of the conventional part supply system, according to the related art, grades A/B/C are set in the order of the high release frequency of parts required by the part supply system being released. In other words, according to the related art, the part with the highest release frequency is disposed close to a conveyor belt that transports the part to a place to be loaded on the automated storage, and is disposed to have a smaller number of parts and a wider storing area, and the part with the lowest release frequency is disposed away from the conveyor belt, and is disposed to have a larger number of parts and a narrower storing area. In addition, according to the related art, the corresponding grade is calculated again based on the release frequency performance every month.

As shown in FIG. 3, since an interval between grades A and C is far, there can be a time difference of up to several minutes in the release time of the part. However, according to the related art, the part required for each process according to the production plan of the actual mobility cannot be matched with each other, thereby causing the time delay. For example, this is because a follow-up work can be delayed when a part C is temporarily released at a specific time zone of the vehicle body production plan of the vehicle on the same day in many cases.

Therefore, in the creating of the part loading schedule (S204), the method for operating the part supply system according to an exemplary embodiment of the present disclosure further includes creating a part storing schedule that determines a location of each part and the number of parts to be stored in the automated storage configured to store the part to be loaded on each work bench to which the part is supplied according to the part loading schedule for each time zone, and the creating of the part storing schedule can create the part storing schedule in consideration of the release frequency of each part every certain period and the part loading schedule of each part. As another exemplary embodiment, in the creating of the part storing schedule, a plurality of automated storages are provided, the volume of the part stored in each automated storage is differently set, and the part storing schedule can be created in consideration of the release frequency of the part stored in each automated storage every certain period and the part loading schedule of the part stored in each automated storage.

The mathematical optimization algorithm can also be used for such a scheduling. Here, the objection function can include the idle time of the part released and/or the blocked time of the part released. In addition, here, the decision variables can include the location of each part and/or the number of parts to be stored in the automated storage. In addition, here, the constraint conditions can include the number of part setboxes that can be stored in the automated storage, the number of part setboxes that can be stored in each part setbox having different volumes, and a storage location that cannot be stored.

FIG. 4 is a diagram showing some steps of a method for operating the part supply system according to an exemplary embodiment of the present disclosure, and in the method for operating the part supply system according to the exemplary embodiment of the present disclosure, the creating of the part loading schedule (S204) can create the part loading schedule in which the work allocation of the part to be loaded on each work bench to which the part is supplied according to the part supply schedule for each time zone, and the sequencing between works are scheduled in consideration of the idle time and the blocked time of each work bench. In other words, according to the exemplary embodiment of the present disclosure, it is possible to allocate the works such as the loading of the part and the transport between the work benches to minimize the idle time and blocked time of each work bench, and to optimize the order of the parts to be loaded or the transport order of the loaded parts.

Before explaining the exemplary embodiment of FIG. 4, it should be noted that FIG. 4 shows an example of some steps of the method for operating the part supply system in which the idle time and/or the blocked time of each work bench can be generated, and it should be noted that the number of work benches, etc. is not limited to quantitative and qualitative expressions.

FIG. 4 shows that each part setbox has a different working time depending upon the number of parts, and the working time is proportional to the horizontal length. In addition, a first part setbox work bench (shown as a circle) and a second part setbox work bench (shown as a regular pentagon) on which parts picked from a first automated storage configured to store a large-sized part and a second automated storage configured to store a medium-sized part with a volume smaller than that of the large-sized part as the respective automated storages differently set for each volume of the part are loaded are separately shown. In addition, the part setbox racks (from the top, first to third part setbox racks) on which the plurality of part setboxes are loaded are separately shown as a part setbox on which loading is completed (shown in solid line) and a part setbox on which loading is to be scheduled (shown in dashed line).

As shown in FIG. 4, the first part setbox rack requires a total of four part setboxes including three medium-sized part setbox and one large-sized part setbox, the second part setbox rack requires one medium-sized part setbox, and the third part setbox rack requires one medium-sized part setbox. In other words, when the required part setboxes are not all loaded, a next work cannot be performed on the corresponding part setbox rack work bench. For example, when the part setbox required in the TE1 process is the part setbox included in the first part setbox rack, the next work can be performed only when all of the corresponding part setboxes (three medium-sized part setboxes and one large-sized part setbox) are contained. Therefore, the blocked time is generated in the part setbox EX without allocated work. Therefore, the work of the part should be allocated to each work bench, and the sequencing between the works with different sizes of the part and different working times required of the part should be set in consideration of the blocked time or the idle time at which the operator cannot work.

FIG. 5 is a diagram showing the part supply system according to an exemplary embodiment of the present disclosure. In the method for operating the part supply system according to the exemplary embodiment of the present disclosure, the creating of the part supply schedule (S202) can create the part supply schedule in which the part setbox on which the plurality of parts required in each process for each time zone are loaded, the part setbox rack on which the part setbox is loaded, and the rank pallet in which the part that cannot be loaded on the part setbox is contained are scheduled. In other words, the part supply system according to the exemplary embodiment of the present disclosure can schedule up to the rank pallet work.

As shown in FIG. 5, the part supply system according to the exemplary embodiment of the present disclosure transports the part through the conveyor belt and therefore, a process of entering and releasing the part into and from the automated storage is first performed. As a next step, the part supply system according to the exemplary embodiment of the present disclosure allows the part setbox to be transported in front of a goods-to-person (GTP), that is, the required part setbox is to be transported in front of an operator from the automated storage. As a next step, the part setbox operator loads the part required for each process on the part setbox, and the part setbox is transported through the conveyor belt so that a part setbox rack operator can load the part setbox on the part setbox rack. The part setbox rack on which loading is completed is transported by logistics equipment such as an automated guided vehicle (AGV) or an automated mobile robot (AMR). Finally, the part that cannot be loaded on the part setbox due to the volume of the box or the limitation to the work bench is additionally contained in the rank pallet. Of course, the corresponding step is additionally performed for only a specific part setbox rack with such a circumstance.

However, as shown in FIG. 5, in actually operating the part supply system after optimization, there can be blocking during the transport for various reasons, thereby delaying the transport time in the step of entering or releasing the part into or from the automated storage and the step of transporting the part setbox through the conveyor belt. In addition, as the time at which the part is supplied to the part setbox work bench from the automated storage is delayed upon the part setbox work, the working time can be delayed.

To solve this problem, a digital twin shown in FIG. 8 will be described below. FIG. 8 is a flowchart showing method for operating the part supply system according to an exemplary embodiment of the present disclosure, and the verifying (S300 of FIG. 1) in the method for operating the part supply system according to the exemplary embodiment of the present disclosure can include verifying whether the part supply schedule satisfies the quantity of parts transported being equal to or larger than a target quantity of parts transported in the part supply schedule including the quantity of parts transported (S302), and after the verifying, the method can modify the part storing schedule that determines the location of each part and the number of parts to be stored in the automated storage configured to store the part if the quantity of parts transported smaller than the target quantity of parts is supplied (S304, S306), and then return to the verifying.

As another exemplary embodiment, the verifying (S300 of FIG. 1) in the method for operating the part supply system according to the exemplary embodiment of the present disclosure can include verifying whether the part supply schedule satisfies the quantity of parts transported being equal to or larger than a target quantity of parts transported in the part supply schedule including the quantity of parts transported (S302), and after the verifying, the method can modify the part loading schedule including the transport path (S305) through which the part whose work is completed on each work bench to which the part is supplied for each time zone is transported if the quantity of parts transported is smaller than the target quantity of parts transported (S306), and then return to the verifying.

As shown in FIG. 8, before supplying the part, a step of optimizing the respective processes going through in the process of producing the mobility and the production plan including the target production quantity can be performed (S100). In addition, as described above, a step of optimizing a logistics operating plan (S200) can be performed, including creating the part supply schedule in which the part required in each process for each time zone is scheduled (S202 of FIG. 1) or creating the part loading schedule in which the part to be loaded on each work bench to which the part is supplied according to the part supply schedule for each time zone is scheduled (S204 of FIG. 1).

In addition, as shown in FIG. 8, as another exemplary embodiment of the present disclosure, a logistics operation simulation through the digital twin is performed (S301), and then if the target quantity of parts transported is not satisfied (S302), whether there is the part supply-related abnormality of the automated storage as the reason thereof can be first detected (S304). Here, the part supply-related abnormality includes a situation to timely supply the part from the automated storage to the part setbox workplace. For example, although a large number of parts C are intensively required in a specific time zone according to the production plan of the mobility on the same day, a large number of parts C are not disposed close to the conveyor belt, thereby delaying the part supply. Alternatively, in the process of supplying the part, the parts at different locations can collide with the part setbox while being transported through the conveyor belt through which the parts are simultaneously transported, and the blocked time can be additionally generated to prevent the collision, thereby delaying the part supply. In this case, as shown in FIG. 8, a step of changing the storing location of the part C to be disposed close to the conveyor belt using reference information of the automated storage system (S305) can be further performed.

Alternatively, as shown in FIG. 8, as another exemplary embodiment of the present disclosure, if there is no part supply-related abnormality of the automated storage (No at S304), whether there is a conveyor transport-related abnormality can be detected (S306). For example, it is assumed that there is a conveyor line shared when the part setbox whose work is completed on the part setbox work bench is transported to the part setbox rack work bench that is the next work. In this case, two part setboxes can collide with each other when being released in the similar time zone, and the blocked time can be additionally generated to prevent the collision. In this case, it is possible to optimize the logistics plan again in consideration of the blocked time and the idle time (S200) and to verify the optimized logistics plan through the digital twin (S301). The logistics operation plan can be confirmed through this verification and applied (S401).

FIG. 6 is a diagram showing a facility configuration according to a method for operating the part supply system according to an exemplary embodiment of the present disclosure, and in the method for operating the part supply system according to the exemplary embodiment of the present disclosure, the automated storage further includes a buffer storage configured to store the part within a preset volume range among the parts whose works are completed on the respective work benches, and the creating of the part loading schedule can create the part loading schedule in which the work allocation of the parts and the sequencing between the works are scheduled in consideration of the idle time and the blocked time of each work bench to which the part outside the volume range is supplied. In other words, the part supply system according to the exemplary embodiment of the present disclosure can be operated to create the part loading schedule in consideration of the point that it has a long working time and cannot use the buffer storage as the large-sized part setbox on which the large-sized part is loaded.

As shown in FIG. 6, the automated storage includes the first automated storage configured to store a medium-sized part within the volume range, the second automated storage configured to store a large-sized part outside the volume range, and the buffer storage configured to store the part setbox on which the medium-sized part is loaded. The buffer storage stores the part setbox on which the medium-sized part is loaded to allow the work to be continuously performed until the next work is performed without waiting for the completion of the large-sized part setbox work even when the corresponding work is completed. However, a case where the buffer of the buffer storage is not secured or the part setbox whose work is completed without being stored in the buffer storage is inevitably accompanied by the blocked time. The part supply system according to the exemplary embodiment of the present disclosure is characterized by optimizing to create the part loading schedule in consideration of the blocked time.

FIG. 7 is a diagram showing work processing states for each workplace and each work bench according to a method for operating the part supply system according to an exemplary embodiment of the present disclosure. As shown in FIG. 7, for the work on each work bench, the blocked time is generated if the buffer function cannot be performed. Considering up to the idle time at which the operator cannot work in the specific time zone like the workplace 3, the exemplary embodiment of the present disclosure that optimizes the part loading schedule considering the idle time and the blocked time uses the buffer storage, thereby smoothing the logistics supply, and at the same time, optimizes the part loading schedule, thereby increasing the rate of work bench used and increasing the efficiency of the entire production facility.

Table 2 below is a table expressing a total amount of reduction in working times that are improved by the scheduling of the part supply system based on the mixed integer programming as the mathematical optimization algorithm according to embodiments of the present disclosure compared to the part supply system based on the rule-based algorithm according to the related art.

TABLE 2

| Case | | Rule-based Algorithm (minutes) | Mixed integer programming (minutes) | Amount of improvement (minutes) | Rate in improvement (%) |
|---|---|---|---|---|---|
| 1 | | 21.9 | 17.6 | 4.3 | 20% |
| 2 | | 19.5 | 17.5 | 2.1 | 11% |
| 3 | | 20.4 | 18.8 | 1.6 | 8% |
| 4 | | 20.2 | 17.5 | 2.8 | 14% |
| 5 | | 20.5 | 17.2 | 3.3 | 16% |
| 6 | | 19.1 | 16.9 | 2.2 | 12% |
| 7 | | 21.3 | 17.4 | 3.9 | 18% |
| 8 | | 19.3 | 17.6 | 1.7 | 9% |
| 9 | | 19.7 | 17.4 | 2.3 | 12% |
| 10 | | 18.7 | 17.1 | 1.6 | 8% |
| Working time | Average | 20.1 | 17.5 | 2.6 | 13% |
| | Max | 21.9 | 18.8 | 4.3 | 20% |
| | Min | 18.7 | 16.9 | 1.6 | 8% |

As described above, the method for operating the part supply system according to the exemplary embodiments of the present disclosure optimizes the logistics work allocation even while simulating and removing the errors due to the logistics transport through the digital twin, thereby achieving a reduction in the total working times.

A processor implementing the aforementioned function, process, and/or method can process data in a state where a power source is supplied, generate a control signal, and provide the control signal. In addition, the processor can be included in a server. In addition, the processor can be configured as a processing circuitry configured to control the function of the server, and the server can include the processor, a transmitter, a receiver, and a memory.

In addition, the processor can be implemented using at least any one of an application specific integrated circuit (ASIC), a digital signal processor (DSP), a programmable logic device (PLD), a field programmable gate array (FPGA), a controller, a micro-controller, a micro-processor, and other electrical units for performing the function.

In addition, the processor can store program codes and data, and be electrically connected to the memory as a recording medium readable by a computer to exchange a signal. The memory can store the data processed by the processor. Here, the memory is hardware and can be configured as at least any one of ROM, RAM, EPROM, flash memory, and a hard drive. The memory can be implemented in the form integrated with the program, or classified as a sub-component of the processor.

Until now, the exemplary embodiments of the present disclosure have been described. Those skilled in the art to which the present disclosure pertains will be able to understand that the present disclosure can be implemented in the modified form without departing from the essential characteristics of the present disclosure.

In other words, since the exemplary embodiments of the present disclosure can be variously changed and can have various forms, the specific exemplary embodiments are shown in the drawings and described in detail in the present specification or application. However, it should be understood that this is not intended to limit the exemplary embodiments according to the concept of the present disclosure to the specific disclosed form, and the present disclosure includes all changes, equivalents, or substitutions included in the spirit and technical scope of the present disclosure.

Therefore, the disclosed exemplary embodiments should be considered from an explanatory point of view rather than a limited point of view. It should be understood that the scope of the present disclosure is described in the claims as well as the aforementioned description, and all differences within the scope equivalent thereto are included in the present disclosure.

What is claimed is:

1. A method for loading and supplying parts required for processes in producing a mobility, the method comprising:
generating, by a processor, a part supply schedule in which the parts required for the processes in producing the mobility for each of a plurality of time zones are scheduled;
generating, by the processor, a part loading schedule in which the parts to be loaded on each work bench to which the parts are supplied according to the part supply schedule for each time zone are scheduled, wherein generating the part loading schedule comprises scheduling a work allocation of the parts to be loaded on each work bench to which the parts are supplied according to the part supply schedule for each time zone and sequencing between works in consideration of an idle time and a blocked time of each work bench;

verifying, by the processor, whether the part loading schedule satisfies the part supply schedule through a digital twin simulation executed by the processor;

modifying, by the processor, the part loading schedule based on the verification through the digital twin simulation; and controlling, by the processor, movement of a conveyor belt based on the part loading schedule, wherein controlling the movement of the conveyor belt comprises:
- detecting, using the verification through the digital twin simulation, a future collision of two part setboxes on the conveyor belt, wherein the future collision is determined to occur when the two part setboxes are conveyed via the conveyor belt towards a part setbox rack workbench; and
- adding additional blocked time to conveyor transport via the conveyor belt of at least one of the two part setboxes to avoid the future collision of the two part setboxes on the conveyor belt.

2. The method of claim 1, further comprising moving the parts from one storage location to another storage location based on modified part loading schedule.

3. The method of claim 2, further comprising producing the mobility using the parts.

4. The method of claim 1, wherein verifying comprises verifying whether the part supply schedule satisfies a quantity of parts transported being equal to or larger than a target quantity of parts transported in the part supply schedule, the method further comprising, in response to a verification that the quantity of parts transported is smaller than the target quantity of parts transported, modifying a part storing schedule that determines a location of each part and a number of the parts to be stored in an automated storage, and then re-verifying.

5. The method of claim 4, further comprising, in response to a verification that the quantity of parts transported is smaller than the target quantity of parts transported, modifying the part loading schedule comprising a transport path along which the part whose work is completed on each work bench is transported, and then re-verifying.

6. The method of claim 1, wherein generating the part supply schedule comprises scheduling a part setbox on which a plurality of the parts required in each process for each time zone are loaded, a part setbox rack on which the part setbox is loaded, and a rank pallet in which a part not loaded on the part setbox is contained.

7. The method of claim 6, wherein generating the part loading schedule comprises scheduling the parts to be loaded on each work bench for each time zone so that total working times required to load the part setbox on the part setbox rack satisfy a minimum working time.

8. The method of claim 6, wherein generating the part loading schedule comprises scheduling the parts to be loaded on each work bench for each time zone to minimize an operation rate deviation between the respective work benches.

9. A computer-implemented method for loading and supplying parts for processes in producing a mobility, the method comprising:
- generating, by a computer, a part supply schedule in which the parts required for the processes in producing the mobility for each of a plurality of time zones are scheduled;
- generating, by the computer, a part loading schedule in which the parts to be loaded on each work bench to which the parts are supplied according to the part supply schedule for each time zone are scheduled,
  wherein generating the part loading schedule comprises scheduling a work allocation of the parts to be loaded on each work bench to which the parts are supplied according to the part supply schedule for each time zone and sequencing between works in consideration of an idle time and a blocked time of each work bench;
- generating, by the computer, a part storing schedule that determines a location of each part and a number of the parts to be stored in an automated storage that stores the parts to be loaded on each work bench;
- verifying, by the computer, whether the part loading schedule satisfies the part supply schedule through a digital twin simulation executed by a processor of the computer;
- modifying, by the computer, the part loading schedule based on the verification through the digital twin simulation; and
- controlling, by the computer, movement of a conveyor belt based on the part loading schedule,
  wherein controlling the movement of the conveyor belt comprises:
  - detecting, using the verification through the digital twin simulation, a future collision of two part setboxes on the conveyor belt, wherein the future collision is determined to occur when the two part setboxes are conveyed via the conveyor belt towards a part setbox rack workbench; and
  - adding additional blocked time to conveyor transport via the conveyor belt of at least one of the two part setboxes to avoid the future collision of the two part setboxes on the conveyor belt.

10. The method of claim 9, wherein generating the part storing schedule is performed in consideration of a release frequency of each part every certain period and the part loading schedule of each part.

11. The method of claim 9, wherein generating the part storing schedule comprises:
- providing a plurality of automated storages that includes the automated storage; and
- setting a volume of the parts stored in each automated storage differently; and
- wherein generating the part storing schedule is performed in consideration of a release frequency of the parts stored in each automated storage every certain period and the part loading schedule of the parts stored in each automated storage.

12. The method of claim 11, wherein:
- each work bench comprises a part setbox work bench to load the part corresponding to each automated storage on a part setbox; and
- generating the part loading schedule comprises scheduling the parts to be loaded on each work bench for each time zone so that total working times required to load the part setbox on which the part corresponding to each automated storage is loaded on a part setbox rack satisfy a minimum working time.

13. The method of claim 9, wherein the automated storage further comprises a buffer storage configured to store a part within a preset volume range among parts whose works are completed on the respective work benches.

14. The method of claim 13, wherein generating the part loading schedule comprises scheduling a work allocation of the parts and sequencing between works in consideration of an idle time and a blocked time of each work bench to which the parts outside the preset volume range are supplied.

15. A server comprising:

a processor;

a non-transitory, computer-readable recording medium coupled to the processor and storing a program for operating a part supply system for loading and supplying parts required for processes in producing a mobility, wherein the program includes computer code that, when executed by the processor, causes the processor to:

generate a part supply schedule in which the parts required for the processes in producing the mobility for each of a plurality of time zones are scheduled;

generate a part loading schedule in which the parts to be loaded on each work bench to which the parts are supplied according to the part supply schedule for each time zone are scheduled, wherein the part loading schedule is generated by scheduling a work allocation of the parts to be loaded on each work bench to which the parts are supplied according to the part supply schedule for each time zone and sequencing between works in consideration of an idle time and a blocked time of each work bench;

verify whether the part loading schedule satisfies the part supply schedule through a digital twin simulation;

modify the part loading schedule based on the verification through the digital twin simulation; and control movement of a conveyor belt based the part loading schedule, wherein, to control the movement of the conveyor belt, the execution of the computer code further causes the processor to:

detect, using the verification through the digital twin simulation, a future collision of two part setboxes on the conveyor belt, wherein the future collision is determined to occur when the two part setboxes are conveyed via the conveyor belt towards a part setbox rack workbench; and add additional blocked time to conveyor transport via the conveyor belt of at least one of the two part setboxes to avoid the future collision of the two part setboxes on the conveyor belt.

16. The server of claim 15, wherein the computer code further causes the processor to verify whether the part supply schedule satisfies a quantity of parts transported being equal to or larger than a target quantity of parts transported in the part supply schedule.

17. The server of claim 16, wherein in response to a verification that the quantity of parts transported is smaller than the target quantity of parts transported, the computer code further causes the processor to:

modify a part storing schedule that includes a location of each part and a number of the parts to be stored in an automated storage configured to store the parts; and verify the modified part storing schedule.

18. The server of claim 16, wherein in response to a verification that the quantity of parts transported is smaller than the target quantity of parts transported, the computer code further causes the processor to:

modify the part loading schedule comprising a transport path along which the part whose work is completed on each work bench is transported; and verify the modified part loading schedule.

19. The method of claim 9, wherein controlling the movement of the conveyor belt comprises moving the parts from one storage location to another storage location based on the confirmed or modified part loading schedule.

20. The method of claim 19, further comprising producing the mobility using the parts.

* * * * *

UNITED STATES PATENT AND TRADEMARK OFFICE
CERTIFICATE OF CORRECTION

| | | |
|---|---|---|
| PATENT NO. | : 12,165,087 B2 | Page 1 of 1 |
| APPLICATION NO. | : 17/871564 | |
| DATED | : December 10, 2024 | |
| INVENTOR(S) | : Jin et al. | |

It is certified that error appears in the above-identified patent and that said Letters Patent is hereby corrected as shown below:

In the Claims

In Column 17, in Claim 15, Line 28, after "based" insert -- on --.

Signed and Sealed this
Fourth Day of February, 2025

Coke Morgan Stewart
*Acting Director of the United States Patent and Trademark Office*